United States Patent Office 3,374,249
Patented Mar. 19, 1968

3,374,249
PHENYLACETONITRILE OXIMES
Charles D. Mitchell, Willow Street, Pa., assignor to Armstrong Cork Company, Lancaster, Pa., a corporation of Pennsylvania
No Drawing. Filed Aug. 3, 1965, Ser. No. 477,003
1 Claim. (Cl. 260—396)

This invention relates to a bis(phenylacetonitrile oxime), and more particularly to such oxime as contains substituted cyclohexadiene rings.

The bis (phenylacetonitrile oxime) of the present invention has the formula

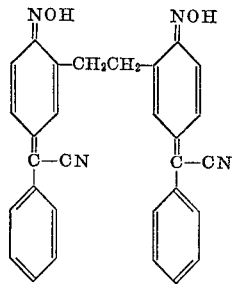

The compound is useful as an ultraviolet light absorber, particularly when distributed throughout a film of a thermoplastic resin such as the polyamides, the polycarbonates, or the acrylates. The bis(phenylacetonitrile oxime) of the present invention may be taken up in a suitable inert solvent system which also contains the dissolved polymer. Bottles or other glass containers, or sheets of glass may then be coated in any convenient manner with the solution. On solution evaporation, a stable, ultraviolet light absorbing film will be left on the glass.

The following example illustrates an embodiment of the invention.

EXAMPLE

*Preparation of 1,2-bis(2-oxo-α-phenyl-3,6-cyclohexadiene-$\Delta^{5,\alpha}$-acetonitrile oxime) ethane—Run 1*

Into a 500 ml. four-necked flask, fitted with reflux condenser, stirrer and thermometer were placed 25 g. (0.385 mole) of potassium hydroxide (assay 86.3%) and 50 ml. of absolute methanol. The mixture was stirred until the potassium hydroxide had dissolved, then cooled to 10°. Benzyl cyanide (9.14 g., 0.078 mole) was added in one portion followed by the addition of 9.27 g. (0.034 mole) of powdered 2,2'-dinitrobibenzyl at 10° C. with stirring. The ice bath was removed. The reaction mixture gradually became deep red, and the 2,2'-dinitrobibenzyl appeared to dissolve. After 20 minutes a deep red solid precipitated. The maximum reaction temperature of 35° was reached after 40 minutes when 35 ml. of absolute methanol was added to impart some degree of fluidity to the reaction mixture. After stirring an additional 3½ hours at room temperature, water (250 ml.) was added. After 10 minutes of vigorous stirring, the deep red mixture was filtered isolating a considerable amount of apparently unreacted 2,2'-dinitrobibenzyl. The clear red filtrate was washed three times with ether; when acidified with dilute acetic acid while cooling and stirring, it gave an orange oil which solidified on standing overnight. The now almost totally alkali insoluble crude oxime (1.0 g., 6.3%) was collected by filtration, washed with ether, and air dried. Recrystallization from pyridine (three times) gave the pure orange oxime, dec. 203–204°.

Calc'd for $C_{30}H_{22}O_2N_4$: C, 76.58; H, 4.71; N, 11.91. Found: C, 76.38; H, 4.69; N, 11.76.

I claim:
1. A bis(phenylacetonitrile oxime) of the formula

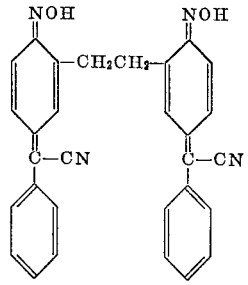

References Cited

UNITED STATES PATENTS 3,156,704  11/1964  Davis _____ 260—396

LORRAINE A. WEINBERGER, *Primary Examiner.*

L. A. THAXTON, *Assistant Examiner.*